(12) United States Patent
Funaki et al.

(10) Patent No.: US 7,273,645 B2
(45) Date of Patent: *Sep. 25, 2007

(54) FLUOROCOPOLYMER

(75) Inventors: Atsushi Funaki, Chiba (JP); Naoko Sumi, Chiba (JP); Eiichi Nishi, Chiba (JP)

(73) Assignees: Asahi Glass Company, Limited, Tokyo (JP); UBE Industries, Ltd., UBE-shi (JP)

( * ) Notice: Subject to any disclaimer, the term of this patent is extended or adjusted under 35 U.S.C. 154(b) by 275 days.

This patent is subject to a terminal disclaimer.

(21) Appl. No.: 10/756,312

(22) Filed: Jan. 14, 2004

(65) Prior Publication Data

US 2004/0142134 A1    Jul. 22, 2004

Related U.S. Application Data

(63) Continuation of application No. 10/361,690, filed on Feb. 11, 2003, now Pat. No. 6,703,465.

(30) Foreign Application Priority Data

| Feb. 22, 2002 | (JP) | 2002-046424 |
| May 20, 2002 | (JP) | 2002-144613 |
| Aug. 20, 2002 | (JP) | 2002-238810 |
| Dec. 12, 2002 | (JP) | 2002-360580 |
| Jan. 20, 2003 | (JP) | 2003-011098 |

(51) Int. Cl.
    *B32B 1/08* (2006.01)

(52) U.S. Cl. ............ 428/36.9; 138/137; 138/140; 138/DIG. 3; 428/36.91; 428/421; 428/422; 428/475.8; 428/476.1; 526/250

(58) Field of Classification Search ............ 428/36.9, 428/36.91, 421, 422, 475.8, 476.1; 138/137, 138/140, DIG. 3
    See application file for complete search history.

(56) References Cited

U.S. PATENT DOCUMENTS

| 4,123,602 A | 10/1978 | Ukihashi et al. |
| 4,513,129 A | 4/1985 | Nakagawa et al. |
| H0469 H | 5/1988 | Deak |
| 4,800,129 A | 1/1989 | Deak |
| 5,372,881 A | 12/1994 | Roller et al. |
| 5,554,425 A | 9/1996 | Krause et al. |
| 6,165,575 A | 12/2000 | Nishi et al. |
| 6,361,841 B1 | 3/2002 | Hasegawa et al. |
| 6,604,551 B2 * | 8/2003 | Nishi et al. ............ 138/137 |
| 6,703,465 B2 * | 3/2004 | Funaki et al. ............ 526/247 |
| 6,753,393 B2 * | 6/2004 | Funaki et al. ............ 526/250 |
| 6,855,787 B2 * | 2/2005 | Funaki et al. ............ 526/250 |
| 2001/0046574 A1 | 11/2001 | Curtis |

FOREIGN PATENT DOCUMENTS

| EP | 0 911 347 | 4/1999 |
| EP | 0957148 | 11/1999 |
| EP | 1336627 | 8/2003 |
| JP | 7/53823 | 2/1995 |
| JP | 7-173446 | 7/1995 |
| JP | 9-194815 | 7/1997 |
| JP | 2002-357285 | 12/2002 |
| WO | WO98/55557 | 12/1998 |

OTHER PUBLICATIONS

U.S. Appl. No. 10/756,312, filed Jan. 14, 2004, Funaki et al.
U.S. Appl. No. 10/356,536, filed Feb. 3, 2003, Funaki et al.
U.S. Appl. No. 10/601,671, filed Jun. 24, 2003, Funaki et al.
U.S. Appl. No. 10/068,865, filed Feb. 11, 2002, Funaki et al.
U.S. Appl. No. 10/676,122, filed Oct. 2, 2003, Sumi et al.
U.S. Appl. No. 11/023,486, filed Dec. 29, 2004, Funaki et al.
U.S. Appl. No. 11/224,969, filed Sep. 14, 2005, Funaki et al.
U.S. Appl. No. 11/580,975, filed Oct. 16, 2006, Funaki et al.
English Abstract of JP 05-132601 (May 28, 1993).

* cited by examiner

*Primary Examiner*—Nasser Ahmad
(74) *Attorney, Agent, or Firm*—Oblon, Spivak, McClelland, Maier & Neustadt, P.C.

(57) ABSTRACT

A fluorocopolymer which comprises (A) polymerized units based on tetrafluoroethylene, (B) polymerized units based on ethylene and (C) polymerized units based on itaconic anhydride or citraconic anhydride, wherein the molar ratio of (A)/(B) is from 20/80 to 80/20, and the molar ratio of (C)/((A)+(B)) is from 1/10000 to 5/100, and which has a volume flow rate of from 1 to 1000 mm$^3$/sec. The fluorocopolymer is excellent in the fuel barrier properties and in the adhesive properties to a non-fluorinated polymer.

21 Claims, No Drawings

FLUOROCOPOLYMER

This application is a Continuation Application of U.S. Ser. No. 10/361,690, filed on Feb. 11, 2003, now U.S. Pat. No. 6,703,465.

The present invention relates to a fluorocopolymer which has a low fuel permeation coefficient and is excellent in the fuel barrier properties and in the adhesive properties to a non-fluorinated polymer.

A fluoropolymer (or a fluorocarbon resin) such as a polytetrafluoroethylene, a tetrafluoroethylene/perfluoro (alkyl vinyl ether) copolymer or an ethylene/tetrafluoroethylene copolymer, has excellent properties such as heat resistance, chemical resistance, weather resistance and gas barrier properties and thus is used in various fields such as semiconductor industry and automobile industry.

In recent years, an application of a fluoropolymer to a part such as a tank, a hose or a tube, particularly to a fuel hose to be used in an engine room of an automobile which is exposed to a severe condition of e.g. a high temperature environment, has been studied. A fuel hose is a hose for piping to transport a gasoline fuel containing an alcohol or an aromatic compound.

Especially, a fuel hose made of a multilayer laminate containing a fluoropolymer, has been studied as one satisfying various required properties. As the material for the inner layer which is in contact directly with a fuel, in the multilayer laminate, it is essential to use a resin which has fuel barrier properties whereby a fuel is hardly permeable, and chemical resistance to an erosive liquid such as ethanol or methanol contained in the fuel. From this viewpoint, the fluoropolymer is suitable as the material for the inner layer, since it is excellent in the heat resistance, chemical resistance and gas barrier properties. Especially, an ethylene/tetrafluoroethylene copolymer (hereinafter referred to as ETFE) is preferred as the material for the inner layer of a fuel hose, since it is excellent in fuel barrier properties.

On the other hand, as the material for the outer layer of a fuel hose, a non-fluorinated polymer excellent in the mechanical properties or durability, will be used. Usually, a polyamide resin such as polyamide 6, polyamide 11 or polyamide 12, is suitable as a non-fluorinated polymer, since it has such excellent properties.

For the above-mentioned fuel hose made of a multilayer laminate, a technique to firmly bond a layer of a fluoropolymer and a layer of a non-fluorinated polymer, is important. If the adhesive strength is inadequate, the layers are likely to peel during use, whereby a problem of clogging of the hose or an increase of the fuel permeability is likely to occur.

Accordingly, a technique to improve the interlaminar adhesion in a multilayer laminate has been studied. For example, it has been proposed to form a tube by extrusion molding of a fluoropolymer, followed by treatment of the outer surface of the fluoropolymer tube by a method such as reagent treatment, corona discharge treatment or plasma discharge treatment, to introduce various adhesive functional groups to the surface. Then, an adhesive is coated as the case requires, followed by laminating a non-fluorinated polymer on the outer side of the tube of the fluoropolymer, by extrusion. By such a method, a fuel hose excellent in the interlaminar adhesion strength can be produced. However, this method has a drawback that the process is cumbersome, and the productivity of the laminate is low. Accordingly, it is desired to develop a fluoropolymer which requires no surface treatment and which can be molded by a simple method such as co-extrusion of the fluoropolymer and a non-fluorinated polymer to obtain a fuel hose or a fuel tank, made of a multilayer laminate.

It is an object of the present invention to provide a fluorocopolymer excellent in the fuel barrier properties and in the adhesive properties to a non-fluorinated polymer, which is desired to be developed under the above-mentioned background.

The present invention provides a fluorocopolymer which comprises (A) polymerized units based on tetrafluoroethylene, (B) polymerized units based on ethylene and (C) polymerized units based on itaconic anhydride or citraconic anhydride, wherein the molar ratio of (A)/(B) is from 20/80 to 80/20, and the molar ratio of (C)/((A)+(B)) is from 1/10000 to 5/100, and which has a volume flow rate of from 1 to 1000 $mm^3$/sec.

Further, the present invention provides a multilayer laminate comprising a layer of the above-mentioned fluorocopolymer and a layer of a non-fluorinated polymer, directly bonded thereto.

Still further, the present invention provides a multilayer laminate comprising a layer of the above-mentioned fluorocopolymer and a layer of a polyamide, directly bonded thereto.

Now, the present invention will be described in detail with reference to the preferred embodiments.

In the present invention, the molar ratio of (A) polymerized units based on tetrafluoroethylene (hereinafter referred to as TFE) to (B) polymerized units based on ethylene (hereinafter referred to as E), is from 20/80 to 80/20, preferably from 50/50 to 70/30, more preferably 50/50 to 60/40. If the molar ratio of (A)/(B) is too small, the heat resistance, weather resistance, chemical resistance, gas barrier properties, fuel barrier properties, etc. of the fluorocopolymer tend to decrease, and if the molar ratio is too large, the mechanical strength, melt processability, etc. tend to decrease. When the molar ratio is within this range, the fluorocopolymer will be excellent in the heat resistance, weather resistance, chemical resistance, gas barrier properties, fuel barrier properties, mechanical strength and melt processability.

(C) polymerized units based on itaconic anhydride or citraconic anhydride is such that the molar ratio of (C)/((A)+(B)) is from 1/10,000 to 5/100, preferably from 5/10,000 to 3/100, more preferably from 7/10,000 to 1/100. If the molar ratio is too small, the adhesive properties to a non-fluorinated polymer will decrease, and if it is too large, the fuel barrier properties will decrease. If it is within this range, the fluorocopolymer will be excellent in the adhesive properties and in the fuel barrier properties. Here, itaconic anhydride (hereinafter referred to as IAN) and citraconic anhydride (hereinafter referred to as CAN) may have been partially hydrolyzed before the polymerization. For example, IAN may be a mixture of IAN and itaconic acid, obtained by partial hydrolysis of IAN. Likewise, CAN may be a mixture of CAN and citraconic acid, obtained by partial hydrolysis of CAN. Further, a part of polymerized units based on IAN or CAN in the fluorocopolymer, may be hydrolyzed after the polymerization. Such polymerized units formed by the hydrolysis before or after the polymerization are regarded as a part of polymerized units (C) in the present invention. For example, the amount of polymerized units (C) represents the total amount of polymerized units based on IAN and polymerized units based on itaconic acid formed by partial hydrolysis of IAN.

If IAN or CAN is used for the production of a fluorocopolymer, it will be unnecessary to use a special polymerization method which is required in a case where maleic anhydride is employed as disclosed in JP-A-11-193312. Namely, it is preferred that an ethylene/tetrafluoroethylene copolymer having polymerized units based on acid anhydride can be obtained without using a perfluorocarboxylic acid or without copolymerizing hexafluoropropylene.

The fluorocopolymer of the present invention may contain, in addition to the polymerized units based on the above (A), (B) and (C), (D) polymerized units based on another monomer other than (A), (B) and (C).

Such another monomer may, for example, be a hydrocarbon olefin such as propylene or butene, a compound of the formula $CH_2=CX(CF_2)_nY$ (wherein each of X and Y which are independent of each other, is a hydrogen atom or a fluorine atom, and n is an integer of from 2 to 8), a fluoroolefin having hydrogen atoms on an unsaturated group, such as vinylidene fluoride, vinyl fluoride or trifluoroethylene, a fluoroolefin having no hydrogen atom on an unsaturated group, such as hexafluoropropylene, chlorotrifluoroethylene or a perfluoro(alkyl vinyl ether) (except for TFE), a vinyl ether such as an alkyl vinyl ether, a (fluoroalkyl) vinyl ether, glycidyl vinyl ether, hydroxybutyl vinyl ether or methyl vinyloxybutyl carbonate, a vinyl ester such as vinyl acetate (hereinafter referred to as VAC), vinyl chloroacetate, vinyl butanoate, vinyl pivalate, vinyl benzoate or vinyl crotonate, or a (meth)acrylate such as a (polyfluoroalkyl) acrylate or a (polyfluoroalkyl) methacrylate. Such another monomer may be used alone or in combination of two or more of them.

As such another monomer, a compound represented by the above $CH_2=CX(CF_2)_nY$ is preferred. More preferred is one wherein n is from 2 to 4, whereby the fluorocopolymer will be excellent in the fuel barrier properties and cracking resistance. Specifically, it may, for example, be $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$ or $CH_2=CH(CF_2)_4H$. It is more preferably $CH_2=CF(CF_2)_2F$, $CH_2=CH(CF_2)_2F$, $CH_2=CH(CF_2)_2H$ or $CH_2=CF(CF_2)_2H$, most preferably $CH_2=CH(CF_2)_2F$.

Further, as such another monomer, a vinyl ester is also preferred. If polymerized units based on a vinyl ester are contained, the fluorocopolymer will be excellent in the adhesive properties, such being desirable. The vinyl ester is more preferably VAC, vinyl chloroacetate, vinyl butanoate or vinyl pivalate, most preferably VAC.

In a case where the fluorocopolymer contains (D) polymerized units based on such another monomer, the content is preferably from 0.01 to 20 mol %, more preferably from 0.1 to 15 mol %, most preferably from 1 to 10 mol %, based on the total polymerized units in the fluorocopolymer.

It is preferred that the fluorocopolymer of the present invention has a molding temperature close to the molding temperature of a non-fluorinated polymer, so that it can be co-extruded with the non-fluorinated polymer to form a multilayer laminate. For this purpose, it is preferred to optimize the melting point of the fluorocopolymer by properly adjusting the proportions of (A), (B) and (C) within the above ranges. Further, it is preferred to incorporate (D), since it is thereby possible to improve the co-extrusion processability with the non-fluorinated polymer by further controlling the melting point of the fluorocopolymer. Further, it is preferred to control the proportions of (C) and (D) to improve the adhesive properties to a layer of a non-fluorinated layer in the multilayer laminate.

Further, in the present invention, it is preferred to have, as a terminal group of the fluorocopolymer, a functional group reactive with a non-fluorinated polymer such as a polyamide, such as an ester group, a carbonate group, a hydroxyl group, a carboxyl group or a carbonyl fluoride group, whereby the adhesive properties to other layers in a multilayer laminate will be improved. It is preferred to introduce such a terminal group by properly selecting a radical polymerization initiator, a chain transfer agent or the like, to be used for the production of the fluorocopolymer.

The volume flow rate (hereinafter referred to as value Q) of the fluorocopolymer of the present invention is from 1 to 1,000 $mm^3/sec$. The value Q is an index for the melt flowability of the fluorocopolymer and may be used as a rough standard for the molecular weight. Namely, the larger the value Q, the lower the molecular weight, and the smaller the value Q, the higher the molecular weight. The value Q in the present invention is the extrusion rate of the fluorocopolymer when it is extruded through an orifice having a diameter of 2.1 mm and a length of 8 mm at a temperature of 297° C. under a load of 7 kg, by means of a flow tester manufactured by Shimadzu Corporation. If the value Q is too small, the extrusion tends to be difficult, and if it is too large, the mechanical strength of the fluorocopolymer tends to decrease. The value Q is preferably from 5 to 500 $mm^3/sec$, more preferably from 10 to 200 $mm^3/sec$.

The method for producing the fluorocopolymer of the present invention is not particularly limited, and a polymerization method employing a commonly employed radical polymerization initiator, may be used. As an example of the polymerization method, bulk polymerization, solution polymerization employing an organic solvent such as a fluorinated hydrocarbon, a chlorinated hydrocarbon, a fluorochlorinated hydrocarbon, an alcohol or a hydrocarbon, suspension polymerization employing an aqueous medium and, if necessary, a suitable organic solvent, or emulsion polymerization employing an aqueous medium and an emulsifier, may be mentioned.

The radical polymerization initiator is preferably such that its decomposition temperature of 10 hours half-life is from 0° C. to 100° C., more preferably from 20 to 90° C. As a specific example, it may, for example, be an azo compound such as azobisisobutylonitrile, a non-fluorinated diacyl peroxide such as isobutyryl peroxide, octanoyl peroxide, benzoyl peroxide or lauroyl peroxide, a peroxy dicarbonate such as diisopropylperoxy dicarbonate, a peroxyester such as tert-butylperoxy pivalate, tert-butylperoxy isobutyrate, or tert-butylperoxy acetate, a fluorinated diacylperoxide such as a compound represented by $(Z(CF_2)_pCOO)_2$ (wherein Z is a hydrogen atom, a fluorine atom or a chlorine atom, and p is an integer of from 1 to 10), or an inorganic peroxide such as potassium persulfate, sodium persulfate or ammonium persulfate.

Further, in the present invention, it is also preferred to use a chain transfer agent to control the value Q of the fluorocopolymer. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. Further, it is preferred to employ a chain transfer agent having a functional group such as an ester group, a carbonate group, a hydroxyl group, a carboxyl group or a carbonyl fluoride group, whereby a terminal group having a reactivity with a polyamide, can be introduced. As such a chain transfer agent, acetic acid, methyl acetate, ethylene glycol or propylene glycol may, for example, be mentioned.

In the present invention, the polymerization conditions are not particularly limited. The polymerization temperature is preferably from 0° C. to 100° C., more preferably from 20 to 90° C. The polymerization pressure is preferably from 0.1 to 10 MPa, more preferably from 0.5 to 3 MPa. The polymerization time is preferably from 1 to 30 hours.

If the concentration of IAN or CAN during the polymerization is too high, the polymerization rate tends to decrease. The concentration of IAN or CAN is preferably from 0.01 to 5%, more preferably from 0.1 to 3%, most preferably from 0.1 to 1%, based on the total molar ratio of TFE and E. If it is within this range, the polymerization rate during the production will not decrease, and the adhesive property of the fluorocopolymer will be excellent. It is advisable to supply the consumed amount of IAN or CAN continuously or intermittently into the polymerization vessel, as IAN or CAN is consumed, in order to maintain the concentration within this range during the polymerization.

The fluorocopolymer of the present invention is excellent in the fuel barrier properties. As an index for the fuel barrier properties, it is preferred to compare the fuel permeability coefficient which can be measured in accordance with a cup method as stipulated in JIS Z0208. The lower the fuel permeability coefficient, the better the fuel barrier properties. The fluorocopolymer of the present invention is characterized in that the fuel permeability coefficient is low.

It is preferred to obtain a laminate in which a layer of the fluorocopolymer of the present invention and a layer of a non-fluorinated polymer are directly bonded to each other.

In the fluorocopolymer of the present invention, it is also preferred to improve the adhesive properties between the layer of the fluorocopolymer and the layer of a non-fluorinated polymer in the multilayer laminate by the following methods.

Namely, preferred is a fluorocopolymer composition (which may also be called a fluorocopolymer modified product, a fluorocopolymer compound or a fluorocopolymer blend product) having an organic peroxide blended to the fluorocopolymer of the present invention, followed by heat treatment.

The organic peroxide to be used here, is preferably such that its decomposition temperature of 1 minute half-life is from 150 to 280° C., more preferably from 170 to 240° C. Specifically, it may, for example, be an aliphatic peroxide such as 2,5-dimethyl-2,5-bis(tert-butylperoxy)hexane, di-tert-butyl peroxide or 2,5-dimethyl-2,5-bis(tert-butylperoxy)hexyne-3, an aromatic peroxide such as 1,4-bis(a-tert-butylperoxyisopropyl)benzene, tert-butylcumyl peroxide or dicumyl peroxide, a ketone peroxide such as methyl ethyl ketone peroxide, a diacyl peroxide such as benzoyl peroxide, a peroxydicarbonate such as diisopropylperoxydicarbonate, an alkyl peroxyester such as tert-butylperoxy isobutyrate, or a hydroperoxide such as tert-butyl hydroperoxide. The organic peroxide may be liquid or solid. The amount of the organic peroxide to be incorporated, is from 0.01 to 10 parts, preferably from 0.1 to 5 parts, per 100 parts of the fluorocopolymer.

As the method for blending an organic peroxide to the fluorocopolymer, followed by heat treatment, it is preferred to employ a method wherein an organic peroxide is mixed to the fluorocopolymer in a powder or granular form by a mixer, followed by melt extrusion. By this method, the organic peroxide is blended to the fluorocopolymer and at the same time, heat-treated to obtain a pelletized fluorocopolymer composition. The heat treatment temperature is preferably from 150 to 280° C., more preferably from 220 to 280° C. i.e. at least the melting point of the fluorocopolymer.

Further, the heat treatment time is preferably short, more preferably from 0.1 to 30 minutes, particularly preferably from 0.5 to 10 minutes.

For the melt extrusion, it is preferred to employ a single screw or twin screw extruder. The cylinder temperature of the extruder is preferably from 100 to 350° C., and the crosshead temperature and the die temperature are each preferably from 200 to 350° C. The rotational speed of the screw is not particularly limited, but it is preferably from 100 to 200 rpm. The retention time in the extruder of the fluorocopolymer is preferably from 1 to 10 minutes. The diameter of the discharge opening of the die is preferably from 2 to 20 mm. A string shaped fluorocopolymer melted and discharged from the discharge opening, is, while being extended, cooled and solidified by water or air and then cut by a cutter to obtain columnar pellets having a length of from 1 to 5 mm and a diameter of from 1 to 5 mm.

In the present invention, a grafted fluorocopolymer composition is also preferred which is obtained by blending a compound (hereinafter referred to as a grafting compound) having a bonding group which can be grafted and a functional group which is capable of imparting adhesive properties, in addition to the organic peroxide, to the fluorocopolymer, followed by heat treatment. By such heat treatment, the grafting compound is grafted to the fluorocopolymer, whereby the functional group to impart adhesive properties, will be introduced to the fluorocopolymer. With the grafted fluorocopolymer composition, the adhesive properties to the non-fluorinated polymer will be improved as compared with the fluorocopolymer to a level of equal to or higher than the above-mentioned fluorocopolymer composition.

The functional group to improve the adhesive properties by grafting, is a group having a reactivity or polarity, and it may, for example, be a carboxyl group, a residual group having two carboxyl groups in one molecule dehydrated for condensation (hereinafter referred to as a carboxylic anhydride residual group), an epoxy group, a hydroxyl group, an isocyanate group, an ester group, an amide group, an aldehyde group, an amino group, a hydrolyzable silyl group, a cyano group, a carbon-carbon double bond, a sulfonic group or an ether group. Among them, preferred is a carboxyl group, a carboxylic anhydride residual group, an epoxy group, a hydrolyzable silyl group or a carbon-carbon double bond. Such a functional group may be contained in a single type in one molecule of the fluorocopolymer, or two or more different types may be contained. Further, two or more such functional groups may be present in one molecule of the fluorocopolymer.

Further, the grafting compound is a compound having the above functional group, and an organic group having an unsaturated double bond or a peroxy group. For example, it may be an unsaturated carboxylic acid, an unsaturated carboxylic anhydride, an epoxy group-containing unsaturated compound, a hydrolyzable silyl group-containing unsaturated compound, or an epoxy group-containing peroxy compound. The amount of the grafting compound to be used, is preferably from 0.001 to 10 parts by mass, more preferably from 0.005 to 5 parts by mass, most preferably from 0.01 to 3 parts by mass, per 100 parts by mass of the fluorocopolymer.

The multilayer laminate formed by using the fluorocopolymer of the present invention comprises (F) a layer of the above-mentioned fluorocopolymer, the fluorocopolymer composition or the grafted fluorocopolymer composition, and (G) a layer of the non-fluorinated polymer. It may, for example, be a multilayer laminate, such as a (F)/(G) laminate composed of two layers of (F) and (G), a (H)/(F)/(G) laminate composed of three layers having (F), (G) and (H) a layer of a fluoropolymer laminated, or a (H)/(F)/(G)/(G) laminate having the number of laminated layers further increased. Here, it is important that (F) and (G) are laminated so that they are in direct contact with each other, whereby a laminate having them firmly bonded can be obtained. Further, the multilayer laminate formed by using the fluorocopolymer of the present invention, may also be preferably a laminate of (F) and (H). It may, for example, be a multilayer laminate such as a (F)/(H) laminate, a (F)/(H)/(H) laminate or a (H)/(F)/(H) laminate.

The laminate in the present invention is a laminate comprising a layer of the fluorocopolymer and a layer of a non-fluorinated polymer, directly bonded thereto.

The adhesive strength between the fluorocopolymer of the present invention and the non-fluorinated polymer, is preferably at least 30 N/cm, more preferably at least 40 N/cm as the interlaminar peel strength between (F) and (G).

Further, in the multilayer laminate formed by using the fluorocopolymer of the present invention, the fluorocopolymer of the innermost layer which will be in contact with a fuel, preferably has an electrical conductivity. It is particularly preferred to employ a fluorocopolymer having electroconductive carbon black incorporated. As the degree of the electrical conductivity, the volume resistivity is preferably at most $1 \times 10^9$ $\Omega \cdot cm$.

The above multilayer laminate is preferably obtained by co-extrusion of the fluorocopolymer, the fluorocopolymer composition or the grafted fluorocopolymer composition, and the non-fluorinated polymer. The co-extrusion is usually a method for obtaining a laminate of two or more layers in the form of a film or a tube. Melts discharged from the discharge openings of two or more extruders, will be in contact in a molten state and passed through a die, whereby they are formed into a laminate. With respect to the extrusion temperature, the screw temperature is preferably from 100 to 350° C., and the die temperature is preferably from 200 to 350° C. The screw rotational speed is not particularly limited, but it is usually preferably from 10 to 200 rpm. The retention time of the melt in the extruder is preferably from 1 to 20 minutes. The non-fluorinated polymer to be used for lamination with the fluorocopolymer of the present invention, the fluorocopolymer composition and the grafted fluorocopolymer composition may, for example, be a polyamide such as polyamide 6, polyamide 66, polyamide 46, polyamide 11, polyamide 12 or polyamide MXD6 (semiaromatic polyamide), a polyester such as polyethylene terephthalate, polybutylene terephthalate, polyethylene naphthalate or polybutylene naphthalate, polyethylene, poly(ethylene/vinyl acetate), polypropylene, polystyrene, polyvinylidene chloride, polyvinyl acetate, polyvinyl alcohol, poly(ethylene/vinyl alcohol), polyacrylonitrile, polyoxymethylene, polyphenylene sulfide, polyphenylene ether, polycarbonate, polyamideimide, polyether imide, polysulfone or polyarylate.

The non-fluorinated polymer is preferably a polyamide such as polyamide 6, polyamide 66, polyamide 46, polyamide 11, polyamide 12 or polyamide MXD6, or a polyester such as polyethylene terephthalate, polybutylene terephthalate, polyethylene naphthalate or polybutylene naphthalate. Particularly preferred is polyamide 11, polyamide 12 or polybutylene naphthalate.

The laminate in the present invention is preferably a laminate comprising a layer of the fluorocopolymer and a layer of a polyamide layer, directly bonded thereto.

The fluorocopolymer of the present invention and the multilayer laminate obtained therefrom, are excellent in heat resistance, chemical resistance, corrosion resistance, oil resistance, weather resistance, etc., and thus are useful for automobile parts, industrial materials, electric and electronic parts, machine parts, parts for office equipments, household appliances, containers, sheets, films, fibers, monofilaments, and other various molded products of optional shapes and applications.

More specifically, tubes or hoses such as tubes or hoses for fuels for automobiles, fuel filler necks, cooling liquid hoses, brake hoses, air conditioning hoses, tubes or hoses for fuel transportation, pipes for oil excavation, paint spray tubes, industrial hoses, or hoses for food products, films or sheets such as films for agricultural use, linings, interior materials for buildings (such as wall papers), or laminated sheet plates, tanks such as tanks for automobile radiators, bottles for chemicals, tanks for chemicals, bags, containers for chemicals or tanks for automobile fuels, or adhesives, may be mentioned.

Now, the present invention will be described in further detail with reference to Examples (Examples 1 to 7, 9 and 10) and Comparative Example (Example 8). However, it should be understood that the present invention is by no means restricted to such specific Examples. Here, the fuel permeability coefficient, the MIT folding endurance, and the content of IAN or CAN, were measured by the following methods.

Fuel Permeability Coefficient

The fuel permeability coefficient of the fluorocopolymer was measured in accordance with a cup method as prescribed in JIS Z0208. From 9.5 to 10 g of fuel E10 (volume ratio of isooctane:toluene:ethanol=50:50:10) was put into a cup having a permeation area of 28.26 $cm^2$, and the top of the cup was covered with a fluorocopolymer sample having a thickness of 100 μm, obtained by press-molding and maintained at 60° C. for 10 days, whereupon from the reduction in mass, the fuel permeability coefficient was obtained. The lower the fuel permeability coefficient, the better the fuel barrier properties.

MIT Folding Test

Measured in accordance with ASTM D2176. Namely, a test specimen having a width of 12.5 mm, a length of 130 mm and a thickness of 0.23 mm, was mounted on a MIT measuring meter, manufactured by Toyo Seiki Seisakusho, and the test specimen was folded under such conditions that the load was 1.25 kg, the folding angle to the left and to the right was 135°, and the number of folding times was 175 times/min, whereby the number of times until the test specimen broke was measured. This test is a test for resistance to fatigue from flexing, of the fluorocopolymer, and the measured value will be an index for cracking resistance. The larger the number of times, the better the cracking resistance.

Content of IAN or CAN

Fluorocopolymer (A) was press-molded to obtain a film having a thickness of 200 urm. In the infrared absorption spectrum, the absorption peak of the stretching vibration of C=O in the polymerized units based on IAN or CAN in the fluorocopolymer (A) appears at 1,870 $cm^{-1}$. The absorbance of such absorption peak was measured, and the content M (mol %) of polymerized units based on IAN or CAN was determined by the formula M=aL, wherein L is the absorbance at 1,870 $cm^1$, and a is a coefficient. As a, a=0.87 was used, which was determined by using IAN as the model compound.

EXAMPLE 1

A polymerization vessel having an internal capacity of 94 l and equipped with a stirrer, was deaerated, and 92.1 kg of 1-hydrotridecafluorohexane, 16.3 kg of 1,3-dichloro-1,1,2,2,3-pentafluoropropane (hereinafter referred to as AK225 cb, manufactured by Asahi Glass Company, Limited), 752 g of VAC, 73 g of $CH_2$=$CH(CF_2)_4F$ and 10.1 g of IAN were charged. 8.5 kg of TFE and 1.3 kg of E were injected, and the temperature in the polymerization vessel was raised to 66° C. As a polymerization initiator, 433 ml of a 1% AK225 cb solution of tert-butyl peroxy pivalate was charged to initiate the polymerization. A monomer mixture gas of TFE/E in a molar ratio of 51/49 was continuously charged so that the pressure would be constant during the polymerization. Further, VAC in an amount corresponding to 11 mol %, and IAN in an amount corresponding to 0.4 mol %, based on the total molar amount of TFE and E charged during the polymerization, were continuously charged. Upon expiration of 5.5 hours from the initiation of the polymerization, and when 8.0 kg of the monomer mixture gas was charged, the internal temperature of the polymerization vessel was lowered to room temperature, and the vessel was purged to normal pressure.

The obtained fluorocopolymer 1 in a slurry form was put into a 200 l granulation vessel having 75 kg of water charged and then granulated with stirring, while distilling off the solvent by raising the temperature to 105° C. The obtained granules were dried at 150° C. for 5 hours to obtain 8.3 kg of granule 1 of fluorocopolymer 1.

From the results of the melt NMR analysis, the fluorine content analysis and the infrared absorption spectrum analysis, the composition of fluorocopolymer 1 was such that the molar ratio of polymerized units based on TFE/polymerized units based on E/polymerized units based on IAN/polymerized units based on VAC/polymerized units of $CH_2$=$CH(CF_2)_4F$ was 45.4/43.1/0.25/10.9/0.24. The melting point was 191° C., the value Q was 160 $mm^3$/sec, the number of MIT folding times was 28,000 times, and the fuel permeability coefficient was 4.36 $gmm/m^2/24$ hr.

By means of an extruder, granule 1 was melt-kneaded at 260° C. for a retention time of 2 minutes to obtain pellets 1. Further, 15 parts of carbon black (granular acetylene black, manufactured by Denki Kagaku Kogyo K. K.) was blended to 100 parts of granule 1, and by means of an extruder, the blend was melt-kneaded at 260° C. for a retention time of 2 minutes to obtain pellets 2 of electroconductive fluorocopolymer 1b.

Polyamide 12 (3030JLX2, manufactured by Ube Industries, Ltd.) was supplied to a cylinder for forming an outer layer; pellets 1 were supplied to a cylinder for forming an interlayer; pellets 2 were suupplied to a cylinder for forming an inner layer; and they were transported to the transport zones of the respective cylinders. The heating temperatures at the transport zones for polyamide 12, pallets 1 and pellets 2 were adjusted to be 240° C., 260° C. and 260° C., respectively. By adjusting the temperature of the coextrusion die at 260° C., three layer coextrusion was carried out to obtain a three layer laminated tube. The laminated tube has an outer diameter of 8 mm, an inner diameter of 6 mm and a thickness of 1 mm, and the outer layer of polyamide 12, the interlayer of fluorocopolymer 1 and the inner layer of electroconductive fluorocopolymer 1b were 0.7 mm, 0.1 mm and 0.2 mm, respectively.

The peel strength between the respective layers of the obtained tube was measured. No peeling was possible between the interlayer of fluorocopolymer 1 and the inner layer of electroconductive fluorocopolymer 1b, and partial cohesive failure was observed, thus showing high adhesive strength. The peel strength between the interlayer of fluorocopolymer 1 and the outer layer of polyamide 12, was 49.8 N/cm.

EXAMPLE 2

8.2 kg of granule 2 of fluorocopolymer 2, was obtained in the same manner as in Example 1 except that prior to the polymerization, 97.6 kg of 1-hydrotridecafluorohexane, 10.8 kg of AK225 cb and instead of IAN, 7.2 g of CAN, were charged, and during the polymerization, CAN was charged instead of IAN. The polymerization time was 7.4 hours.

From the results of the melt NMR analysis, the fluorine content analysis and the infrared absorption spectrum analysis, the composition of fluorocopolvmer 2 was such that the molar ratio of polymerized units based on TFE/polymerized units based on E/polymerized units based on CAN/polymerized units based on VAC/polymerized units based on $CH_2$=$CH(CF_2)_4F$ was 45.4/43.3/0.24/10.9/0.23. The melting point was 187° C., the value Q was 165 $mm^3$/sec, the number of MIT folding times was 26,000 times, the fuel permeability coefficient was 4.27 $gmm/m^2/24$ hr.

Using an extruder, granule 2 was melt-kneaded at 260° C. for a retention time of two minutes to prepare pellets 3. Further, 15 parts of carbon black (granular acetylene black, manufactured by Denki Kagaku Kogyo K. K.) was blended to 100 parts of granule 2, and by means of an extruder, the blend was melt-kneaded at 260° C. for a retention time of two minutes to obtain pellets 4 of electroconductive fluorocopolymer 2b.

Polyamide 12 of Example 1 was supplied to a cylinder for forming an outer layer, pellets 4 were supplied to a cylinder for forming an inter layer, and they were transported to the transport zones of the respective cylinders. The heating temperatures at the transport zones for polyamide 12 and pellets 4 were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm. The outer layer of polyamide 12 and the inner layer of electroconductive fluorocopolymer 2b were 0.7 mm and 0.3 mm, respectively. The peel strength between the inner layer and the outer layer was 47.3 N/cm.

EXAMPLE 3

Polyamide 12 of Example 1 was supplied to a cylinder for forming an outer layer, pellets 2 of Example 1 were supplied to a cylinder for forming an inner layer, and they were transported to the transport zones of the respective cylinders. The heating temperatures at the transport zones for polyamide 12 and pellets 2, were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm. The outer layer of polyamide 12 and the inner layer of electroconductive fluorocopolymer 1b were 0.7 mm and 0.3 mm, respectively. The peel strength between the inner layer and the outer layer was 45.5 N/cm.

EXAMPLE 4

To 100 parts of granule 1 of Example 1, 1.5 parts of tert-butyl peroxide was uniformly mixed and then melt-kneaded at 260° C. for a retention time of 3 minutes by means of a twin screw extruder, to obtain pellets 5 of fluorocopolymer composition 1c.

Polyamide 12 of Example-1 was supplied to a cylinder for forming an outer layer, pellets 5 were supplied to a cylinder for forming an interlayer, pellets 2 were supplied to a cylinder for forming an inner layer, and they were transported to the transport zones of the respective cylinders. The heating temperatures at the transport zones for polyamide 12, pellets 5 and pellets 2, were adjusted to be 240° C., 260° C. and 260° C., respectively. By adjusting the temperature of the co-extrusion die at 260° C., three layer co-extrusion was carried out to obtain a three layer laminated tube. The laminated tube had an outer diameter of 8 mm, an inner diameter of 6 mm and a thickness of 1 mm. The outer layer of polyamide 12, the interlayer of fluorocopolymer composition 1c and the inner layer of electroconductive fluorocopolymer 1b were 0.7 mm, 0.1 mm and 0.2 mm, respectively.

The peel strength between the respective layers of the obtained tube was measured. No peeling was possible between the interlayer of fluorocopolymer composition 1c and the inner layer of electroconductive fluorocopolymer 1b, and partial cohesive failure was observed, thus showing high adhesive strength. The peel strength between the interlayer of fluorocopolymer composition 1c and the outer layer of polyamide 12, was 53.6 N/cm.

EXAMPLE 5

To 100 parts of granule 1 of Example 1, 1.5 parts of tert-butyl peroxide and 15 parts of carbon black (granular acetylene black, manufactured by Denki Kagaku Kogyo K. K.), were uniformly mixed and then melt-kneaded at 260° C. for a retention time of 3 minutes by means of a twin screw extruder, to obtain pellets 6 of electroconductive fluorocopolymer composition 1cb.

Polyamide 12 of Example 1 was supplied to a cylinder for forming an outer layer, pellets 6 were supplied to a cylinder for forming an inner layer, and they were transported to the transport zones of the respective cylinders. The heating temperatures at the transport zones for polyamide 12 and pellets 6 were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm. The outer diameter of polyamide 12 and the inner layer of electroconductive fluorocopolymer composition 1cb were 0.7 mm and 0.3 mm, respectively. The peel strength between the inner layer and the outer layer was 50.1 N/cm.

EXAMPLE 6

Polymerization and granulation were carried out in the same manner as in Example 1 except that IAN charged prior to the polymerization was changed to 14.4 g, and IAN charged during the polymerization was changed to 0.8 mol % based on the total molar amount of TFE and E, to obtain 7.5 kg of fluorocopolymer 3 and granule 3. The polymerization time was 10.7 hours. The composition of fluorocopolymer 3 was such that the molar ratio of polymerized units based on TFE/polymerized units based on E/polymerized units based on IAN/polymerized units based on VAC/polymerized units based on $CH_2=CH(CF_2)_4F$, was 45.6/42.8/0.50/10.8/0.27. The melting point was 183° C., the value Q was 265 mm$^3$/sec, the number of MIT folding times was 18,000 times, and the fuel permeability coefficient was 4.69 gmm/m$^2$/24 hr. To 100 parts of granule 3, 15 parts of carbon black (granular acetylene black, manufactured by Denki Kagaku Kogyo K. K.) was blended, and the blend was melt-kneaded at 260° C. for a retention time of two minutes by means of an extruder to obtain pellets 7 of electroconductive fluorocopolymer 3b.

Polyamide 12 of Example 1 was supplied to a cylinder for forming an outer layer, pellets 7 were supplied to a cylinder for forming an inner layer, and they were transported to the transport zones of the respective cylinders. The heating temperatures at the transport zones for polyamide 12 and pellets 7 were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm. The outer layer of polyamide 12 and the inner layer of electroconductive fluorocopolymer 3b were 0.7 mm and 0.3 mm, respectively. The peel strength between the inner layer and the outer layer was 52.2 N/cm.

EXAMPLE 7

Polymerization and granulation were carried out in the same manner as in example 1 except that 46 g of $CH_2=CH(CF_2)_2F$ was charged instead of $CH_2=CH(CF_2)_4F$, to obtain 8.2 kg of fluorocopolymer 4 and granule 4. The polymerization time was 6.0 hours.

The composition of fluorocopolymer 4 was such that the molar ratio of polymerization units based on TFE/polymerized units based on E/polymerized units based on IAN/polymerized units based on VAC/polymerized units of $CH_2=CH(CF_2)_2F$, was 46.1/42.9/0.25/10.5/0.28. The melting point was 188° C., the value Q was 210 mm$^3$/sec, the number of MIT folding times was 23,000 times, and the fuel permeability coefficient was 4.13 gmm/m$^2$/24 hr.

To 100 parts of granule 4, 15 parts of carbon black (granular acetylene black, manufactured by Denki Kagaku Kogyo K. K.) was blended, and the blend was melt-kneaded at 260° C. for a retention time of two minutes by means of an extruder to obtain pellets 8 of electroconductive fluorocopolymer 4b.

Polyamide 12 of Example 1 was supplied to a cylinder for forming an outer layer, pellets 8 were supplied to a cylinder for forming an inner layer, and they were transported to the transport zones of the respective cylinders. The heating temperatures at the transport zones for polyamide 12 and pellets 8 were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm. The outer layer of polyamide 12 and the inner layer of electroconductive fluorocopolymer 4b were 0.7 mm and 0.3 mm, respectively. The peel strength between the inner layer and the outer layer was 51.0 N/cm.

EXAMPLE 8 (COMPARATIVE EXAMPLE)

8.0 kg of fluorocopolymer 5 and granule 5 were obtained in the same manner as in Example 1 except that IAN was not charged before and during the polymerization, and before the polymerization, 423 g of VAC was charged, and VAC charged during the polymerization was in an amount corresponding to 5.0 mol % based on the total molar amount of TFE and E. The polymerization time was 1.8 hours.

From the results of the melt NMR analysis and the fluorine content analysis, the composition of fluorocopolymer 5 was such that the molar ratio of polymerized units based on TFE/polymerized units based on E/polymerized units based on VAC/polymerized units based on $CH_2=CH(CF_2)_4F$, was 48.3/46.2/5.2/0.3. The melting point was 232° C., and the value Q was 15.4 $mm^3$/sec.

To 100 parts of granule 5, 15 parts of carbon black (granular acetylene black, manufactured by Denki Kagaku Kogyo K. K.) was blended, and the blend was melt-kneaded at 260° C. for a retention time of two minutes by means of an extruder to obtain pellets 9 of electroconductive fluorocopolymer 5b.

Polyamide 12 of Example 1 was supplied to a cylinder for forming an outer layer, pellets 9 were supplied to a cylinder for forming an inner layer, and they were transported to the transport zones of the respective cylinders. The heating temperatures at the transport zones for polyamide 12 and pellets 9 were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm, and the outer layer of polyamide 12 and the inner layer of electroconductive fluorocopolymer 5b were 0.7 mm and 0.3 mm, respectively. The peel strength between the inner layer and the outer layer was 25.0 N/cm.

EXAMPLE 9

The polymerization vessel used in Example 1, was deaerated, and 71.3 kg of 1-hydrotridecafluorohexane, 20.4 kg of AK225cb, 562 g of $CH_2=CH(CF_2)_2F$, and 4.45 g of IAN, were charged. The temperature in the polymerization vessel was raised to 66° C., and the pressure was increased to 1.5 MPa/G by a gas of TFE/E in a molar ratio of 89/11. As a polymerization initiator, 1 l of a 0.7% hydrotridecafluorohexane solution of tert-butyl peroxy pivalate, was charged to initiate the polymerization. A monomer mixture gas of TFE/E in a molar ratio of 59.5/40.5, was continuously charged so that the pressure became constant during the polymerization.

Further, $CH_2=CH(CF_2)_2F$ in an amount corresponding to 3.3 mol % and IAN in an amount corresponding to 0.8 mol %, based on the total molar amount of TFE and E charged during the polymerization, were continuously charged. Upon expiration of 9.9 hours from the initiation of the polymerization and when 7.28 kg of the monomer mixture gas was charged, the temperature in the polymerization vessel was lowered to room temperature, and purging was carried out to normal pressure.

The obtained fluorocopolymer 6 in a slurry form, was put into a 200 l granulation vessel charged with 77 kg of water. Then, temperature was raised to 105° C. with stirring, and granulation was carried out while distilling off the solvent. The obtained granules were dried at 150° C. for 15 hours to obtain 6.9 kg of granule 6 of fluorocopolymer 6.

From the results of the melt NMR analysis, the fluorine content analysis and the infrared spectrum analysis, the composition of fluorocopolymer 6 was such that the molar ratio of polymerized units based on TFE/polymerized units based on E/polymerized units based on IAN/polymerized units based on $CH_2=CH(CF_2)_2F$, was 57.4/38.6/0.48/3.5.

The melting point was 230° C., the value Q was 48 $mm^3$/sec, the number of MIT folding times was 38,900 times, and the fuel permeability coefficient was 5.5 $gmm/m^2/24$ hr.

Using an extruder, granule 6 was melted at 260° C. for a retention time of 2 minutes to prepare pellets 10 of fluorocopolymer 6.

Polyamide 12 of Example 1 was supplied to a cylinder for forming an outer layer, pellets 10 were supplied to a cylinder for forming an inter layer, and they were transported to the transport zones of the respective cylinders. The heating temperatures at the transport zones for polyamide 12 and pellets 10 were adjusted to be 240° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm. The outer layer of polyamide 12 and the inner layer of fluorocopolymer 6 were 0.7 mm and 0.3 mm, respectively. The inner layer and the outer layer were firmly bonded and could not be peeled, whereby no measurement of the peel strength was possible.

EXAMPLE 10

Polybutylene naphthalate (Perplane EN-5000, manufactured by Toyobo Co., Ltd.) was supplied to a cylinder for forming an outer layer, pellets 10 of Example 9 were supplied to a cylinder for forming an inner layer, and they were transported to the transport zones of the respective cylinders. The heating temperatures at the transport zones for polybutylene naphthalate and pellets 10, were adjusted to be 250° C. and 260° C., respectively. By adjusting the temperature of the co-extrusion die at 260° C., two layer co-extrusion was carried out to obtain a two layer laminated tube. The laminated tube had an outer diameter of 8 mm, an inner diameter of 6 mm and a thickness of 1 mm, and the outer layer of polybutylene naphthalate and the inner layer of fluorocopolymer 1 were 0.7 mm and 0.3 mm, respectively. The inner layer and the outer layer were firmly bonded and could not be peeled.

As described in the foregoing, the fluorocopolymer of the present invention has a low fuel permeability coefficient and is excellent in the fuel barrier properties. Further, it is excellent also in cracking resistance and is excellent in the adhesive properties to a fluorinated polymer.

Further, it can be co-extruded with another fluoropolymer or a non-fluorinated polymer to present a laminate excellent in the adhesive properties. The fluorocopolymer of the present invention is suitable as a material for constituting a layer of a fuel hose made of a multilayer laminate, particularly as a material for constituting a layer which is in contact directly with a non-fluorinated polymer.

Further, a fluorocopolymer composition having an organic peroxide incorporated to the fluorocopolymer of the present invention, followed by heat treatment, and a grafted fluorocopolymer composition having an organic peroxide and a compound having a bonding group capable of being grafted and a functional group capable of imparting adhesive properties incorporated to the fluorocopolymer of the present invention, followed by heat treatment, will be excellent in adhesion to a non-fluorinated polymer such as a polyamide and thus will be suitable as a material for constituting a layer for bonding the fluorocopolymer layer and the non-fluorinated polymer layer.

The entire disclosure of Japanese Patent Application No. 2002-046424 filed on Feb. 22, 2002, Japanese Patent Application No. 2002-144613 filed on May 20, 2002, Japanese Patent Application No. 2002-238810 filed on Aug. 20, 2002, Japanese Patent Application No. 2002-360580 filed on Dec. 12, 2002 and Japanese Patent Application No. 2003-11098 filed on Jan. 20, 2003 including specification, claims and summary is incorporated herein by reference in its entirety.

What is claimed is:

1. A multi-layer laminate hose having a fluorocopolymer layer and a polyamide resin layer directly laminated thereto, wherein the fluorocopolymer comprises (A) polymerized units of tetrafluoroethylene, (B) polymerized units of ethylene and (C) polymerized units of itaconic anhydride or citraconic anhydride, in which the molar ratio of (A)/(B) is from 20/80 to 80/20, and the molar ratio of (C)/((A)+(B)) is from 1/10000 to 5/100, and which has a volume flow rate of from 1 to 1000 $mm^3$/sec.

2. The multi-layer laminate hose according to claim 1, wherein the molar ratio of(C)/((A)+(B)) is from 1/1000 to 5/100.

3. The multi-layer laminate hose according to claim 1, wherein the laminate is obtained by co-extrusion molding.

4. The multi-layer laminate hose according to claim 1, wherein the laminate is obtained by co-extrusion molding.

5. The multilayer laminate of claim 1, wherein the fluorocopolymer further comprises (D) polymerized units of another monomer, in an amount of from 0.01 to 20 mol %, based on the total polymerized units in the fluorocopolymer.

6. The multilayer laminate according to claim 5, wherein said another monomer is a compound represented by $CH_2$-$(CX(CF_2)_nY$ wherein each of X and Y which are independent of each other, is a hydrogen atom or a fluorine atom, and n is an integer of from 2 to 8.

7. The multilayer laminate according to claim 6, wherein n is from 2 to 4.

8. The multilayer laminate according to claim 1, wherein the molar ratio of (A)/(B) is from 50/50 to 60/40.

9. The multilayer laminate according to claim 1, wherein the molar ratio of(C)/((A)+(B)) is from 3/2000 to 3/100.

10. The multilayer laminate according to claim 1, wherein said another monomer is $CH_2=CH(CF_2)_nF$, wherein n is from 2 to 4.

11. The multilayer laminate according to claim 1, wherein the molar ratio of(C)/((A)+(B)) is from 3/1000 to 3/100.

12. The multilayer laminate according to claim 1, wherein the volume flow rate is from 5 to 500 $mm^3$/sec.

13. The multilayer laminate according to claim 1, wherein the volume flow rate is from 10 to 200 $mm^3$/sec.

14. The multilayer laminate according to claim 1, wherein the fluorocopolymer has a functional group reactive with a non-fluorinated polymer, wherein the functional group is selected from the group consisting of an ester group, a carbonate group, a hydroxyl group, a carboxyl group, a carbonyl fluoride group or a combination thereof.

15. The multilayer laminate according to claim 1, wherein the polymerized units (C) are present in an amount of from 0.01 to 5% based on the total molar ratio of tetrafluoro ethylene and ethylene.

16. The multilayer laminate according to claim 1, wherein the polymerized units (C) are present in an amount of from 0.1 to 1% based on the total molar ratio of tetrafluoroethylene and ethylene.

17. The multilayer laminate according to claim 1, further comprising polymerized units of a vinyl ester (E).

18. The multilayer laminate according to claim 17, wherein the vinyl ester is selected from the group consisting of vinyl acetate, vinyl chloroacetate, vinyl butanoate and vinyl pivalate.

19. The multilayer laminate according to claim 1, wherein the fluorocopolymer further comprises polymerized units of vinyl acetate.

20. The multilayer laminate according to claim 6, further comprising polymerized units of vinyl acetate.

21. The multilayer laminate according to claim 1, wherein the multilayer laminate is in the shape of a tube.

* * * * *